H. J. HEIDER.
DRAFT ATTACHMENT.
APPLICATION FILED OCT. 6, 1910.
989,146.
Patented Apr. 11, 1911.
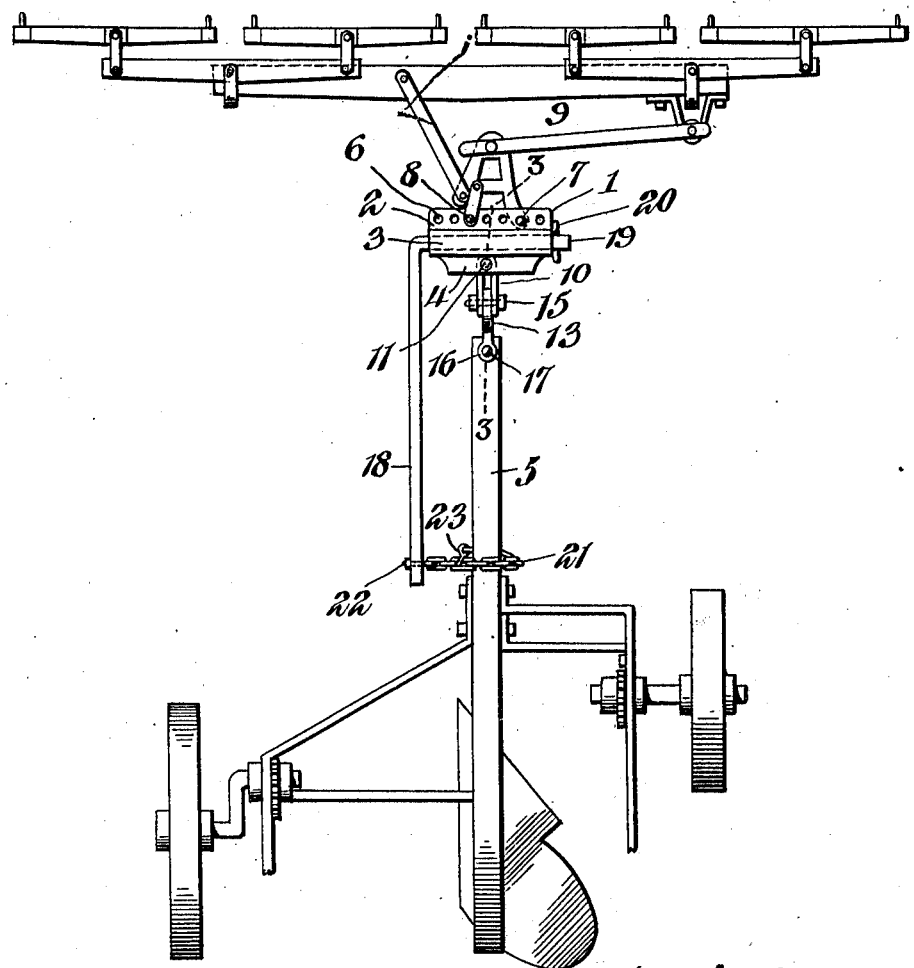
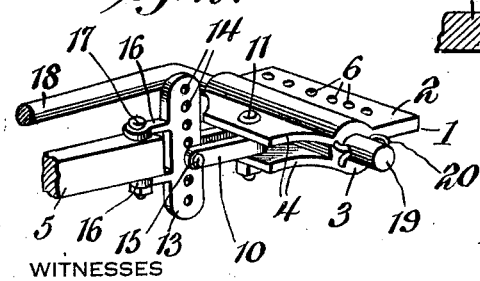
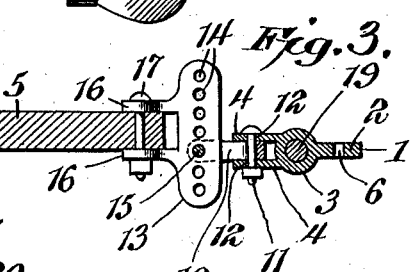
Henry J. Heider, INVENTOR,
WITNESSES
BY
ATTORNEY

UNITED STATES PATENT OFFICE.

HENRY J. HEIDER, OF CARROLL, IOWA, ASSIGNOR TO HEIDER MFG. CO., OF CARROLL, IOWA.

DRAFT ATTACHMENT.

989,146. Specification of Letters Patent. Patented Apr. 11, 1911.

Application filed October 6, 1910. Serial No. 585,689.

*To all whom it may concern:*

Be it known that I, HENRY J. HEIDER, a citizen of the United States, residing at Carroll, in the county of Carroll and State of Iowa, have invented a new and useful Draft Attachment, of which the following is a specification.

The invention relates to a draft attachment for plows and analogous implements. The object of the present invention is to provide a simple, efficient and comparatively inexpensive draft attachment of great strength and durability, adapted to be applied to the clevis of a plow or implement in which no provision is made for transverse adjustment or attachment at a plurality of points, and capable of enabling a draft equalizer to be connected with such a clevis and to be adjusted laterally to suit the requirements of a plow or cultivator.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a plan view of a draft attachment, constructed in accordance with this invention and shown applied to a plow and a draft equalizer. Fig. 2 is an enlarged detail perspective view of the draft attachment. Fig. 3 is a longitudinal sectional view on the line 3—3 of Fig. 1.

Like numerals of reference designate corresponding parts in all the figures of the drawing.

In the embodiment of the invention illustrated in the accompanying drawing, 1 designates a transverse clevis member, consisting preferably of a malleable casting, but it may be constructed of any other suitable material. The clevis member 1 consists of a horizontal forwardly extending flange 2, an intermediate tubular or cylindrical portion 3 and upper and lower spaced rearwardly extending horizontal flanges 4. The front horizontal flange or portion 2 is disposed transversely with relation to the beam 5 of the wheeled plow or similar vehicle or implement to which the device is applied, and it is provided with a transverse row of perforations 6, arranged at intervals and adapted to receive the connecting or attaching bolts 7 and 8 of a draft equalizer 9. Bolts or any other suitable fastening devices may be employed for securing the draft equalizer to the transverse clevis member, and as the particular construction of the draft equalizer does not constitute a portion of the present invention and as the draft attachment may be employed in connection with various types of draft equalizers, a detail description of the draft equalizer shown in the drawing is, therefore, deemed unnecessary.

The spaced rearwardly extending flanges 4, which are integral with the intermediate transversely disposed tubular portion, receive a horizontally disposed approximately U-shaped coupling yoke 10, connected to the transverse clevis member by a centrally arranged bolt 11, or other suitable fastening device, which is arranged in registering perforations 12 of the upper and lower flanges 4, as clearly illustrated in Fig. 3 of the drawing. The U-shaped coupling member 10 embraces an upright plow clevis 13, provided at intervals with perforations 14 for the reception of a pivot bolt 15, which pierces the sides of the coupling yoke. The upright clevis 13 is provided with spaced rearwardly extending arms 16, arranged at the upper and lower faces of the plow beam 5 and secured to the same by a vertical bolt 17, which pierces the plow beam 5 and the arm 16. The upright clevis affords vertical adjustment, and the transverse clevis member enables the draft equalizer to be attached at a plurality of points and to be adjusted transversely of the plow. A further adjustment is effected through an approximately L-shaped bar or lever 18, extending longitudinally of the plow beam 5 and provided in advance of the same with a transverse arm 19, which passes through the transverse opening in the intermediate tubular portion 3 of the clevis member 1.

The transverse arm is round so as to turn in the transverse opening of the clevis member, and it is retained in the opening by a pin or key 20, piercing the terminal portion of the transverse arm 19 and arranged at one side of the clevis member 1, as clearly shown in Figs. 1 and 2 of the drawing. Any other suitable means, however, may be employed for securing the transverse arm of the bar or lever 18 in the opening of the clevis member. The rear end of the bar or member 18 is adjustably connected with the plow beam by a chain 21, or other suitable connection, and it is adapted to be arranged either in parallelism with the plow beam or at an angle thereto to change the relation or position of the draft equalizer with respect to the plow beam. One end of the chain 21 is equipped with an eye bolt 22, which pierces the rear end of the bar or lever, and the other end of the chain is equipped with a hook 23, which is adapted to engage the various links of the chain. The chain is passed around the plow beam and the bar or lever adjusted to the proper position, and the hook 23 is then engaged with one of the links for securing the bar or lever in such adjustment. In the adjustment of the attachment through the bar or lever 18, the clevis member is adapted to swing on the rear pivot bolt 11.

Having thus fully described my invention, what I claim as new and desire to secure by Letters Patent, is:—

1. A draft attachment of the class described comprising a clevis member having a transverse attaching portion at its front and provided at the back with spaced upper and lower flanges, a pivot carried by the said flanges, a coupling yoke secured between the flanges by the said pivot and adapted to embrace an upright clevis and provided with means for pivotally connecting it with the same, and a lever connected to and extending rearwardly from the clevis member and provided with means for connecting it to a tongue or beam.

2. A draft attachment of the class described comprising a clevis member having a transverse attaching portion at its front and provided at the back with spaced upper and lower flanges, a pivot carried by the said flanges, a coupling yoke secured between the flanges by the said pivot and adapted to embrace an upright clevis and provided with means for pivotally connecting it with the same, and an adjusting bar or lever connected with the clevis member for swinging the same on the pivot thereof.

3. A draft attachment of the class described comprising a clevis member provided with a front transversely disposed attaching portion having means for connecting it with a draft equalizer, said clevis member being also provided at the back with means for connecting it with a plow beam and having a transverse opening at an intermediate point, and a longitudinal adjusting bar or lever having a transverse portion secured in the opening of the clevis member.

4. A draft attachment of the class described comprising a clevis member provided at the front with a horizontal flange having a transverse series of perforations, said clevis member being also provided at an intermediate point with a transverse opening and having a rearwardly extending attaching portion, an upright pivot carried by the rearwardly extending portion of the clevis member, means for connecting such pivot with the clevis of a plow beam, and a longitudinally disposed adjusting bar or lever provided at the front with a transverse arm secured in the opening of the clevis member.

5. A draft attachment of the class described including a transverse clevis member comprising a front attaching flange provided at a plurality of points with means for connecting it with a draft equalizer, an intermediate tubular portion forming a transverse opening, spaced upper and lower flanges extending rearwardly from the tubular portion, a coupling yoke pivotally mounted between the rearwardly extending flanges, and a longitudinal adjusting bar or lever provided at the front with an arm secured in the transverse opening of the clevis member.

6. A draft attachment of the class described including a transverse clevis member provided at a plurality of points with means for connecting it with the draft equalizer, said clevis member being provided at an intermediate point with a transverse opening and having a rearwardly extending attaching portion, means for pivotally connecting the rearwardly extending attaching portion with the clevis of a plow beam, a longitudinal bar or lever having a round transverse arm secured in the transverse opening of the clevis member, and means for adjustably connecting the rear portion of the bar or lever with the plow beam.

7. A draft attachment comprising a clevis member provided at the front with means for connecting thereto the draft appliance, means at the rear for connecting the clevis member to the beam of a plow or other implement, said means permitting the clevis member to have both a vertical and a horizontal movement, a longitudinally disposed bar arranged alongside the beam and having its front end provided with a transverse arm, which is mounted to turn in a transverse bearing of the clevis member, and means for connecting the rear end of the bar to the beam.

In testimony, that I claim the foregoing as my own, I have hereto affixed my signature in the presence of two witnesses.

HENRY J. HEIDER.

Witnesses:
A. E. BRYAN,
WM. HEIDER.

Copies of this patent may be obtained for five cents each, by addressing the "Commissioner of Patents, Washington, D. C."